US011575682B2

(12) United States Patent
Kumar et al.

(10) Patent No.: US 11,575,682 B2
(45) Date of Patent: Feb. 7, 2023

(54) ASSIGNING CONTEXTUAL IDENTITY TO A DEVICE BASED ON PROXIMITY OF OTHER DEVICES

(71) Applicant: Amazon Technologies, Inc., Seattle, WA (US)

(72) Inventors: Lomash Kumar, Redmond, WA (US);
Jijo Raphael Jose, Kirkland, WA (US);
Alok Kumar Jha, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 614 days.

(21) Appl. No.: 16/584,861

(22) Filed: Sep. 26, 2019

(65) Prior Publication Data
US 2021/0099460 A1     Apr. 1, 2021

(51) Int. Cl.
| | |
|---|---|
| H04L 29/06 | (2006.01) |
| G06F 15/16 | (2006.01) |
| G06F 7/04 | (2006.01) |
| H04L 9/40 | (2022.01) |
| H04L 41/0853 | (2022.01) |
| H04L 41/12 | (2022.01) |
| H04W 4/02 | (2018.01) |

(Continued)

(52) U.S. Cl.
CPC ........ *H04L 63/107* (2013.01); *H04L 41/0853* (2013.01); *H04L 41/12* (2013.01); *H04L 63/0807* (2013.01); *H04L 63/0823* (2013.01); *H04W 4/023* (2013.01); *H04W 8/005* (2013.01); *H04W 64/003* (2013.01)

(58) Field of Classification Search
CPC ... H04L 63/107; H04L 41/0853; H04L 41/12; H04L 63/0807; H04L 63/0823

USPC .......................................................... 726/5
See application file for complete search history.

(56) References Cited

U.S. PATENT DOCUMENTS

| | | | |
|---|---|---|---|
| 9,413,827 B2* | 8/2016 | Sharma | H04W 4/70 |
| 9,438,440 B2* | 9/2016 | Burns | H04L 67/12 |
| 10,511,938 B1* | 12/2019 | Marinovic | H04W 4/029 |

(Continued)

OTHER PUBLICATIONS

Yosef Ashibani; Design and Implementation of a Contextual-Based Continuous Authentication Framework for Smart Homes; Year: 2018: MDPI; pp. 1-20.*

(Continued)

*Primary Examiner* — Monjur Rahim
(74) *Attorney, Agent, or Firm* — Robert C. Kowert; Kowert, Hood, Munyon, Rankin & Goetzel, P.C.

(57) ABSTRACT

A device management service at a provider network may assign a contextual identity to a newly installed device at a client network based on proximity of other devices to the new device. When a new device is installed on a client network, the device broadcasts a request for proximity data. When another device receives the request, it generates proximity data. For example, it may measure a strength of the radio signal received from the new device, which varies depending on how close the devices are. The new device receives proximity data from the other devices on the client network. The new device then transmits the proximity data to a device management service. The device management service uses an algorithm to determine an estimated location of the new device based on the proximity data. The device management service determines a contextual identity of the new device based on the estimated location.

20 Claims, 7 Drawing Sheets

(51) Int. Cl.
*H04W 8/00* (2009.01)
*H04W 64/00* (2009.01)

(56) References Cited

U.S. PATENT DOCUMENTS

| | | | | |
|---|---|---|---|---|
| 10,965,473 B2* | 3/2021 | Rahman | ............... | H04W 12/04 |
| 11,272,446 B2* | 3/2022 | Wang | ............... | H04L 67/12 |
| 2014/0244710 A1* | 8/2014 | Sharma | ............... | H04W 4/08 |
| | | | | 709/201 |
| 2015/0029880 A1* | 1/2015 | Burns | ............... | H04W 84/18 |
| | | | | 370/252 |
| 2015/0130957 A1* | 5/2015 | Berelejis | ............... | H04L 67/12 |
| | | | | 348/211.1 |
| 2015/0201022 A1* | 7/2015 | Kim | ............... | H04L 67/125 |
| | | | | 709/203 |
| 2016/0036764 A1* | 2/2016 | Dong | ............... | H04L 61/3025 |
| | | | | 370/254 |
| 2016/0043962 A1* | 2/2016 | Kim | ............... | H04L 67/02 |
| | | | | 709/224 |
| 2016/0357764 A1* | 12/2016 | Glover | ............... | G06Q 30/0267 |
| 2016/0358187 A1* | 12/2016 | Radocchia | ............... | H04L 63/061 |
| 2016/0380968 A1* | 12/2016 | Sarwar | ............... | H04W 8/24 |
| | | | | 709/245 |
| 2017/0034700 A1* | 2/2017 | Cohen | ............... | H04W 12/50 |
| 2017/0064073 A1* | 3/2017 | Spencer | ............... | H04M 1/72463 |
| 2017/0180380 A1* | 6/2017 | Bagasra | ............... | H04L 63/101 |
| 2017/0187807 A1* | 6/2017 | Clernon | ............... | H04L 67/34 |
| 2017/0345019 A1* | 11/2017 | Radocchia | ............... | H04L 9/3239 |
| 2018/0020329 A1* | 1/2018 | Smith | ............... | H04L 67/12 |
| 2018/0084517 A1* | 3/2018 | Do | ............... | H04W 4/029 |
| 2018/0158104 A1* | 6/2018 | Malloy | ............... | H04W 4/023 |
| 2018/0183874 A1* | 6/2018 | Cook | ............... | H04L 41/145 |
| 2018/0249298 A1* | 8/2018 | Jain | ............... | G06K 9/6267 |
| 2018/0376417 A1* | 12/2018 | Wang | ............... | H04W 52/0254 |
| 2019/0011617 A1 | 1/2019 | Cheng et al. | | |
| 2019/0020718 A1* | 1/2019 | Mathews | ............... | H04L 67/125 |
| 2019/0116087 A1* | 4/2019 | Hiller | ............... | H04L 67/12 |
| 2020/0396772 A1* | 12/2020 | Tirronen | ............... | H04W 4/38 |

OTHER PUBLICATIONS

International Search Report and Written Opinion from PCT/US2020/050812, dated Nov. 6, 2020, pp. 1-13.

* cited by examiner

Proximity Certificate
300

| Field | Description |
|---|---|
| Issuer (Device ID or peer ID) | Fan123 |
| Proximity Measure Type | Radio Signal Strength (dBm) |
| Proximity Measurement | -70 |
| Cryptographic Signature by Issuer | 4b01c786b36b9abe128dec |

ASSIGNING CONTEXTUAL IDENTITY TO A DEVICE BASED ON PROXIMITY OF OTHER DEVICES

BACKGROUND

The Internet of Things (IoT) is a phrase given for the interconnection of computing devices scattered around the globe within the existing internet infrastructure. IoT devices may be used for a variety of consumer and industrial applications. For example, a light bulb may include computing components that allow the light bulb to communicate with a device management service of a service provider network or to communicate with other IoT devices via an internet connection. This may allow a homeowner to install the light bulb in a kitchen and to turn the light on and off from a remote location or to obtain operational status of the light bulb using the device management service.

When a new IoT device is installed, a contextual identity may need to be assigned to the device so that a user can easily identify a particular IoT device to for controlling or monitoring purposes. For example, the phrase "kitchen lightbulb123" may be assigned to a lightbulb by an end user or a technician during installation of the lightbulb in a kitchen. End users who install the light bulb may decide the location of the bulb (e.g., kitchen versus bedroom) just before installation. Therefore, the mapping between a device's identity (e.g., "lightbulb123") and its context (e.g., "kitchen") is captured manually at the time of installation in order to allow for meaningful control and monitoring of the lightbulb. Manually assigning and configuring a contextual identity data for one or more different IoT devices can be a time consuming and error-prone process.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The systems and methods described herein implement techniques for assigning contextual identity to a device (e.g., an IoT device) of a client network based on proximity of other devices of the client network. During the process of registering a new device with a device management service of a provider network, the device management service may assign a contextual identity to the new device (e.g., "bedroom lightbulb123"). After the contextual identity is assigned to the new device, the user may quickly identify the new device using its assigned contextual identity (e.g., to control or monitor the device).

In embodiments, as part of the device registration process, a new device may first get onboarded (e.g., new device ID added to a user's account and set up for remote login/connection to the device management service) without the user manually entering any contextual identification for the new device. After the new device is physically installed on the user's network (e.g., client network), the new device connects to the device management service. For example, the new device may connect to an endpoint at the device management service associated with the user's account at the device management service. In some embodiments, the device management service may detect that there is no contextual identity assigned to the new device.

When the device management service detects that there is no contextual identity assigned to the new device, the device management service may send a request to the device to gather proximity data from other devices on the client network (e.g., devices that have already been registered with the device management service) and/or send a signed token to the new device (e.g., included in the request for proximity data). In response to receiving the request and/or signed token, the new device may broadcast a request for the proximity data (e.g., "who is here" request) on the client network. In embodiments, the request may include the signed token.

In embodiments, "proximity data" for a device may be data that indicates proximity of the device to the new device (e.g., indicates how close the other device is to the new device). In some embodiments, the proximity data for a device may be obtained by the device from one or more measurements of proximity performed by the device (e.g., by one or more sensors of the device that detect environmental conditions and/or network conditions at the device). For example, proximity data for one of the other devices may indicate a radio signal of high strength was received from the new device (indicating the other device is very close to the new device), whereas proximity data from a different one of the other devices may indicate a radio signal of low strength was received from the new device (indicating the different device is far from the new device and/or farther away from the new device than the other device).

In various embodiments, any type of wireless or wired communication may be used for the new device to communicate with other devices on the client network. For example, the client network may use Wi-Fi, Bluetooth, Bluetooth (e.g., classic or low-energy), Zigbee, Z-Wave, etc. In some embodiments, proximity data for a device may be included within a signed certificate issued by the device or otherwise encrypted. Therefore, as used herein, the term "proximity data" may be replaced with "proximity certificate" and vice versa. In embodiments, "other devices" may be replaced with "peer devices" and vice versa. In embodiments, the client network is a local network of a company or other organization (e.g., a local or private network behind a gateway or firewall).

In embodiments, other devices on the client network that receive the request for proximity data may respond (e.g., using an agent installed on the device) by sending proximity data for the other device to the new device. In some embodiments, the user's security policy may indicate that before a device can respond, it must first verify the request for the proximity data based on the received signed token (e.g., verify the signature of the token). Therefore, depending on the security policy, peer devices may only respond to a request (e.g., broadcast request or any other type of request) that includes a signed token from their owner (e.g., the user), so that peer devices are restricted to issuing proximity data only to devices that have been verified via a signed token (e.g., devices that are owned by the same owner). In some embodiments, the other devices (e.g., registered devices) listen and/or monitor (e.g., at periodic intervals, using an agent) for any requests for proximity data that may be transmitted (wired or wirelessly) from any newly-installed devices (including the new device). Upon detecting the request for proximity data, the other devices process the request as described herein.

In various embodiments, the new device may join the wireless network and send and/or broadcast the request for proximity data to one or more other devices of the local network by transmitting the request to the local network's broadcast address (e.g., via a wireless and/or wired signal). The network hardware may then send the packet to every other device (or at least a group of devices that includes any number of devices) on the local network. In embodiments, the request for proximity data may include an identifier/network address that uniquely identifies the new device and/or the signed token that uniquely identifies the new device.

In some embodiments, the new device receives the proximity data from one or more of the other devices on the client network. The new device may then transmit the proximity data for the one or more other devices to the device management service of the remote provider network. In embodiments, the new device may wait for a threshold amount of time after sending out the request (e.g., broadcast request or other type of request) and/or wait to receive proximity data from a threshold number of other devices before transmitting the proximity data to the device management service.

The device management service may receive proximity data for one or more of the other devices of the remote network. In embodiments, the other devices may have been previously registered with the device management service (e.g., before installation of the device). Therefore, the device management service may already store and/or have access to various attributes of each of the other devices. For each registered device, the device management service may store the device ID, network address, subnet, the contextual identity, one or more encryption keys, location and/or estimated location, and/or any other attributes for the particular device.

In embodiments, after receiving the proximity data for one or more of the other devices of the remote network, the device management service may determine, based at least on the proximity data for the one or more other devices, an estimated location of the new device. For example, if the proximity data includes different measurements of strength of a radio signal (or strength/intensity of sound) received from the particular device by the other devices, then the device management service may use algorithms (e.g., based on radio signal strength, sound intensity and/or triangulation, etc.) to calculate, based on the different measurements of strength of a radio signal (or sound) received from of or more of the other devices, an estimated location of the new device.

In various embodiments, the proximity data may include any type of measurement performed by each of the one or more other device devices that varies according to the distance of the other device to the new device (e.g., strength of sound level or strength of an electromagnetic signal such as radio waves, microwaves, infrared radiation, visible light, ultraviolet radiation, X-rays, and/or gamma rays). In some embodiments, the proximity data may include one or more measurements of a direction from which a received signal or sound wave was transmitted (e.g., measurement of a direction vector of the radio signal or sound received by the one or more devices from the new device). Based at least on triangulation algorithms, the location of the new device may be determined by the device management service based on proximity data from two or more other devices that includes measurements of a direction from which the received signal or sound was transmitted. In some embodiments, the proximity data of one or more of the other devices may include both a signal strength (or sound strength/intensity measured in decibels, for example) and a direction vector.

In an embodiment, two or more types of proximity data may be used by the device management service to calculate an estimated location of the new device. For example, the device management service may use one or more algorithms to calculate, based on measurements of strength (and/or direction vectors) of two or more different types of electromagnetic signals received by each of the other devices, an estimated location of the new device. For example, radio waves of one frequency may be used to calculate an estimated location, radio waves of another frequency may be used to calculate another estimated location, and the average of the two locations may be used as the estimated location. In embodiments, sound may be measured as well as one or more electromagnetic signals and the device management service may use one or more algorithms to calculate, based on measurements of strength (and/or direction vectors) of the sound and the one or more signals, an estimated location of the new device (e.g., by determining an average of each estimated location).

In various embodiments, any type of data (or combination of different types of data) suitable may be used by the device management service in conjunction with the proximity data to estimate the location of the new device. For example the device management service may use algorithms to calculate, based on a type of the one or more other devices, a network address of the one or more other devices, a subnet of the one or more other devices, a device (e.g., a hub device) that the new device and one or more other devices are both connected to (physically or wirelessly), and/or a floor plan associated with the remote client network, an estimated location of the new device.

In embodiments, the device management service may use algorithms to calculate, based on global positioning system (GPS) data and/or altimeter data provided by the one or more other devices (and/or any of the other data described herein), an estimated location of the new device. Therefore, the one or more other devices may each have any number of GPS sensors, altimeter sensors, and/or other location-determining sensors that may be used by the one or more other devices to generate GPS, altitude, and/or other data indicating a location, which may be send to the new device as part of the proximity data and/or proximity certificate.

After the device management service determines the estimated location for the new device, the device management service may then determine a contextual identity for the new device based at least on the estimated location. In some embodiments, some or all of the physical space (e.g., available locations for devices) at a site of the client network may be mapped to a context (e.g., a description of the physical space). The device management service may store and/or have access to the mapping.

In embodiments, the device management service may determine the context based on the mapping and determine the contextual identity for the new device based on the context and/or other data (e.g., identification for the new device). For example, the device management service may determine, based on the estimated location and the mapping, that the context for the new device is "kitchen." The device management service may also determine that the device name for the new device is "lightbulb123" (e.g., based on data previously entered during the on-boarding process). In this case, the device management service may determine the contextual identity for the lightbulb to be "kitchen lightbulb123."

In various embodiments, the device management service may determine the context/contextual identity of the new device based on a location of the new device within a hierarchy of devices (e.g., based on the mapping). For example, the device management service may determine the contextual identity of a thermostat to be "building 7, floor 13, room 73, thermostat155" and the context of another thermostat to be "building 11, floor 27, room 83, thermostat 222." This provides different granularities of control of devices for a user or device management service. For example, by specifying a device type "thermostat," floor 27, building 11, and "70 degrees," a user may set all thermostats on floor 27 of building 11 to 70 degrees (e.g., any number of thermostats located on that floor). As another example, by specifying "thermostat," building 7, "reset," a user may reset all thermostats in building 7 (e.g., any number of thermostats located within building 7).

In some embodiments, the device management service may determine a contextual identity for the new device based only on the mapping of physical space to context. For example, the device management service may simply determine that the contextual identity for the lightbulb is "kitchen." In embodiments, the device management service may allow a user or algorithm to modify the contextual identity after the contextual identity is assigned based on the mapping. For example, a user or algorithm may add the text "lightbulb #3" to create the contextual identity "kitchen lightbulb #3."

After the device management service determines the contextual identity for the new device, then the device management service may assign the determined contextual identity to the new device. This may include storing the contextual identity and associating the contextual identity with the device ID, device name, and/or other data for the new device.

In various embodiments, the device management service receives a selection or approval of the determined contextual identity (e.g., via a management interface and/or client management device) before the device management service assigns the contextual identity to the new device (e.g., "supervised" assignment of a contextual identity). For example, the device management service may determine one or more contexts based on the mapping and determine one or more different potential contextual identities for the new device based on the one or more contexts and/or other data (e.g., identification for the new device, type of the device, floor plan, etc.). The device management service may then display (e.g., via a management interface and/or client management device) the one or more potential contextual identities and receive, from a user or administrator, a selection of the potential contextual identity from among the one or more potential contextual identities.

In some embodiments, the device management service may display a location map to assist a user in making a determination and a selection of contextual identity for a new device. For example, the estimated location(s) may be correlated to one or more possible locations on the location map. In embodiments, the location map may show a floorplan (e.g., walls, furniture, and/or other physical objects) and/or the locations or estimated locations of one or more of the other devices (e.g., other devices registered with the device management service.

In embodiments, the device management service may determine multiple contexts based on the mapping when a confidence level of the estimated location is relatively low (e.g., below a threshold level). For example, if the confidence level of the estimated location is less than 80% (e.g., less than 80% chance that the device is within a threshold distance of the estimated location), then two or more different estimated locations (e.g., two or more different rooms or bounded areas) may be used by the device management service, resulting in two or more different mappings and therefore two or more different contexts. This results in two or more different contextual identities to choose from. In these cases, it may be useful for a user to manually determine the correct context/contextual identity for the new device.

After the device management service assigns the contextual identity to the new device and/or performs one or more other tasks associated with installing the new device, the new device is registered with the device management service. Therefore, it may be used to provide proximity data to additional devices that are subsequently installed.

In embodiments, one or more of the algorithms used by the device management service to determine the estimated location of the new device based at least on the proximity data for the one or more other devices may be performed by a model (e.g., a machine learning model). As used herein, a model may be any data processing model suitable for processing input data to generate one or more results. For example, a model may include a neural network, deep neural network, static or dynamic neural network, a memory network, and/or any other model architecture suitable for processing input data (e.g., from sensors) and generating one or more results/predictions. Thus, in embodiments, a model may include any computational model, machine learning model, or artificial intelligence model suitable for processing data and generating one or more results. Moreover, different models may include different model architectures and/or be trained based on the same or different training data. In embodiments, the estimated location of a device may be a probabilistic location (e.g., 90% chance or a 90% confidence level that the location is correct).

In various embodiments, any suitable security communication protocols may be used to protect data that is being sent between any devices (e.g., client devices, servers, etc.) and between devices of different networks (e.g., client networks, provider networks). For example, data may be encrypted using SSL (secure socket layer), TLS (transport layer security), HTTPS (secure hypertext transfer protocol), and/or any other suitable network security protocol.

Embodiments allow for contextual identity of a newly installed IoT device to be automatically determined and assigned to the new device. Since manually assigning and configuring a contextual identity data for a devices can be a time consuming and error-prone process, the embodiments described herein may speed up the process of onboarding new devices while at the same time reduce the amount of incorrectly installed devices (e.g., have the wrong contextual identity assigned). Furthermore, embodiments may eliminate the need for a technician or other third party to manually log into a user's account to set the contextual identity for devices, thus reducing security risks associated with exposure of the user's sensitive data (e.g., login information, network configuration, and other private/proprietary information).

Figure 1:
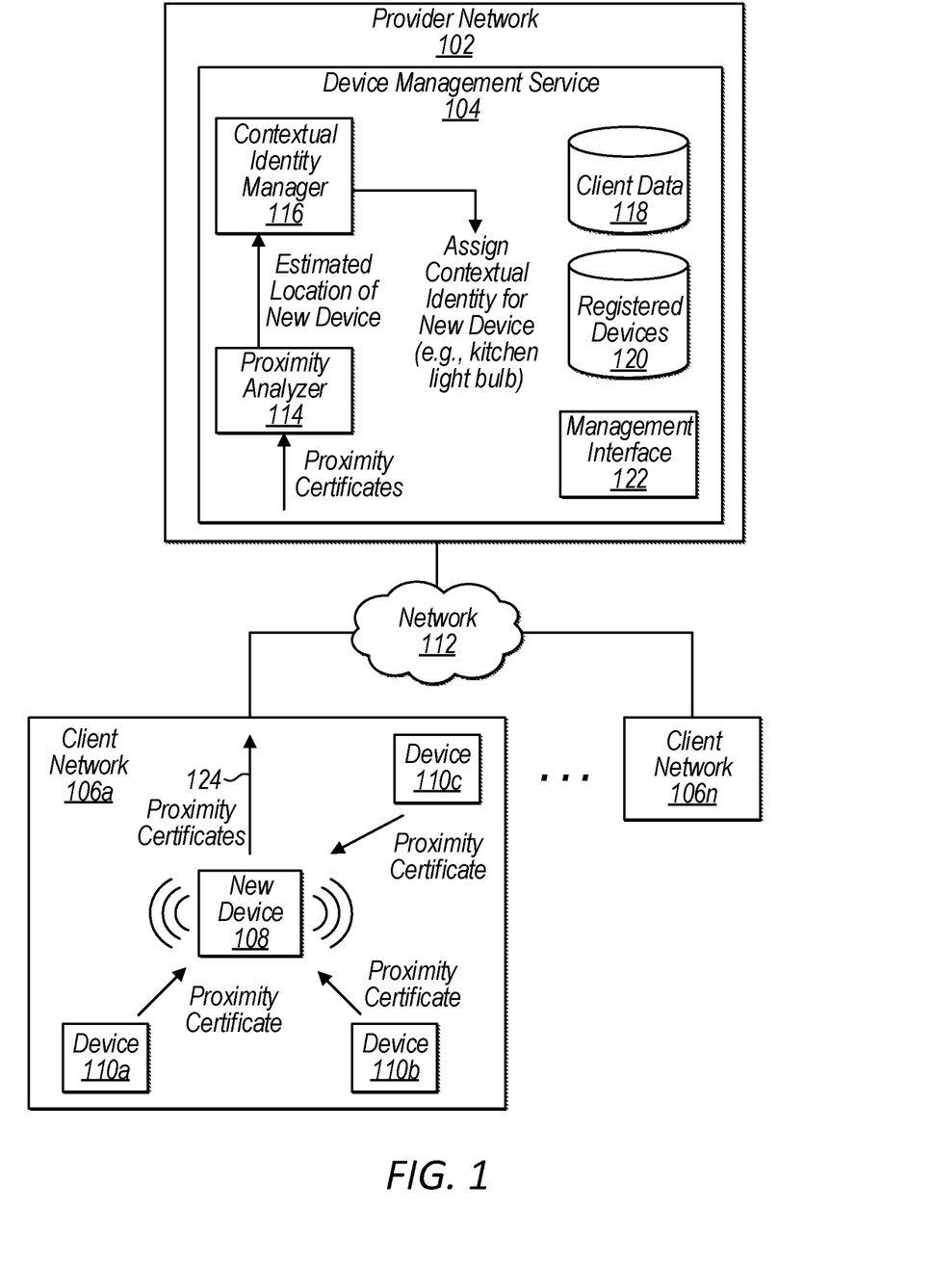
FIG. 1 illustrates a system for assigning contextual identity to a new device of a client network based on proximity of other devices, according to some embodiments.

FIG. 1 illustrates a system for assigning contextual identity to a new device of a client network based on proximity of other devices, according to some embodiments. A provider network 102, device management service 104, client network 106, new device 108, devices 110, and any other components depicted in FIG. 1 may be the same as or include one or more of the same components as the provider network, device management service, client network, new device, devices, and any other components discussed in any of FIGS. 2-6, in embodiments. In various embodiments, the provider network, device management service, client network, new device, devices, and any other components discussed in any one of FIGS. 1-6 may be the same component as (e.g., same type of component) or include one or more of the same components as the provider network, device management service, client network, new device, devices, and any other components discussed in any other one of FIGS. 1-6.

As shown, devices on the client networks 106 may communicate with components of the provider network 102 by transmitting data via a wide-area network 112 (e.g., the internet). Thus, the provider network 102 may be considered a remote provider network with respect to the devices of the client networks and may be in another physical location than the client devices/client networks (e.g., another building, city, state, or country). As depicted, devices of any number of client networks 106 (e.g., corresponding to different clients of the device management service) may communicate with the provider network via the network 112.

In the depicted embodiment, the device management service 104 includes a proximity analyzer 114 and a contextual identity manager 116 that analyze proximity data of devices and assign contextual identity to new devices, as described below. The device management service 104 also includes client data 118, which is a data store that includes data associated with each client as described herein (e.g., one or more encryption keys of the client, location-context mapping for the client network, floorplan, etc.).

The device management service 104 also includes a registered devices 120 data store that may store any data associated with a particular registered device and/or new device as described herein (e.g., device ID, type of device, network address, subnet, the contextual identity, one or more encryption keys, location and/or estimated location, and/or any other attributes, etc.). In embodiments, at least some of the data used by the device management service 104 may be stored by another service of the provider network (e.g., a database service).

As shown, the device management service 104 includes a management interface 122 that communicates (e.g., via an application programming interface) with a user or administrator (e.g., via a management device of the client network). For example, a user at the client network may use a graphical user interface of a management device to upload new device data, location-context mappings, data models, algorithms, and floorplan data to the device management service.

In embodiments, a new device 108 is installed on the client network 106 by a user (e.g., a user, administrator, and/or owner of other devices 110 of the client network. As described herein, the device management service 104 may, in embodiments, detect that the new device does not have a contextual identity assigned to it and in response, sends are request for proximity data and/or signed token to the new device 108.

In embodiments, any other suitable technique for triggering the new device to obtain proximity data for the device management service 104 may be implemented. For example, a user may trigger the device after installing it on the client network, or the device may be triggered in response to being connected to the client network and/or upon powering up.

In the depicted embodiment, the new device 108 sends a request for the proximity data on the client network (e.g., broadcasts the request to one or more other devices on the client network). In embodiments, the request may include a signed token previously obtained from the client network, as described for FIG. 2. As described in FIG. 2, the new device 108 and the other devices 110 may each have an agent (e.g., pre-installed by a manufacturer/service provider or downloaded from the provider network/device management service and installed on the device) that performs the various functions described herein for the devices 108, 110.

When a particular device 110 receives the request for proximity data from the new device 108, the device the device 110 obtains and/or generates proximity data based on the proximity of the device 110 to the new device 108. For example, to generate proximity data, the device 110 may measure the strength of a radio signal received from the new device (e.g., Wi-Fi, Bluetooth, Bluetooth (e.g., classic or low-energy), Zigbee, Z-Wave, etc.).

In embodiments, the device 110 may then generate a proximity certificate that includes an identifier for the device (e.g., device ID), proximity data (e.g., measurement and/or measurement type), and a cryptographic signature of the device (e.g., using an encryption key assigned to the device). In some embodiments, the certificate may be an X.509 certificate (e.g., follow some or all of the X.509 standard defining the format of public key certificates).

In some cases, there may not be a need or desire by the client to use certificates and/or tokens. Therefore, in embodiments, certificates and/or tokens are not used by the new device 108 and/or the other devices 110. Instead, the proximity data and/or other data may simply be generated and/or provided to the new device 108 when another device 110 receives a request from the new device 108 for proximity data.

As shown, the new device 108 collects the proximity certificates 124 from the different devices 110 and transmits them to the device management service 104. The proximity analyzer 114 obtains the proximity certificates 124 and verifies each of the certificates based on the respective signatures of each certificate. For any certificates that are found to be invalid for any reason, the proximity analyzer 114 may discard the certificate and/or proximity data.

In embodiments, the proximity analyzer 114 may then obtain the proximity data from the verified certificates and determine, based at least on the proximity data for the one or more other devices 110, an estimated location of the new device 108. As discussed herein, the determination may be made based on measurements of the proximity respectively performed by the one or more other devices and/or other types of proximity data/proximity data.

As depicted, after the proximity analyzer 114 determines the estimated location for the new device 108, the contextual identity manager 116 uses the estimated location to determine a contextual identity for the new device 108 (e.g., based on a mapping of locations to contexts). For example, the contextual identity manager 116 may determine, based on the estimated location and the mapping, that the context for the new device 108 is "front entrance." The contextual identity manager 116 may also determine that the device name for the new device 108 is "camera3" (e.g., based on data previously entered during the on-boarding process). In this case, the contextual identity manager 116 may determine the contextual identity for the new device 108 to be "front entrance camera3."

After the contextual identity manager 116 determines the contextual identity for the new device 108, the contextual identity manager 116 may assign the determined contextual identity to the new device 108. This may include storing the contextual identity and associating the contextual identity with the device ID, device name, and/or other data for the new device 108.

Figure 2:
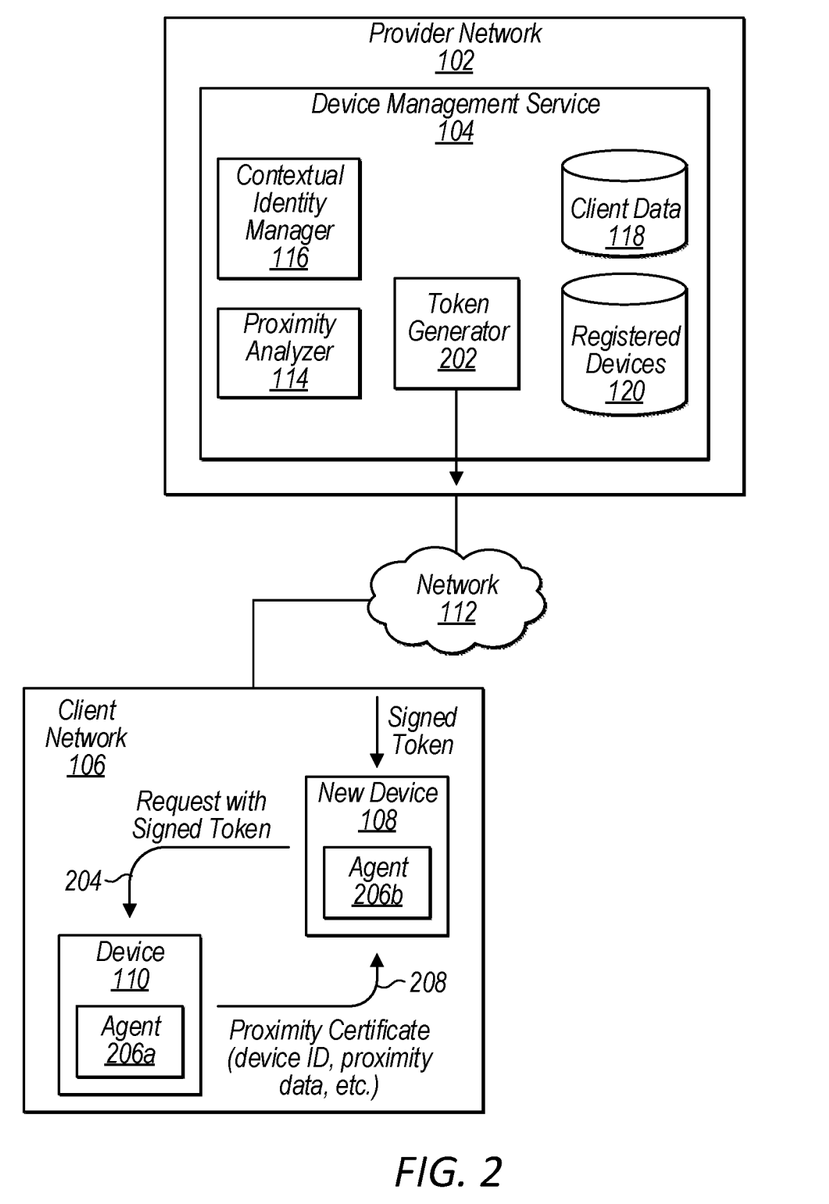
FIG. 2 illustrates an example of a new device of a client network that receives a signed token from a device management service and includes the signed token in a request for proximity data from other devices, according to some embodiments.

FIG. 2 illustrates an example of a new device of a client network that receives a signed token from a device management service and includes the signed token in a request for proximity data from other devices, according to some embodiments. As shown, a token generator 202 at the device management service 104 generates a signed token and transmits the signed token to the new device 108.

The signed token may by digitally signed using an encryption key assigned to the user and therefore is configured to be used by other devices 110 to verify the request 204 for the proximity data. In embodiments, the encryption key may be stored by the device management service 104 (e.g., client data 118).

As depicted, the new device 108 and the other devices 110 may each have an agent 206 (e.g., downloaded from the provider network/device management service and installed on the device) that performs the various functions described herein for the devices 108, 110.

When a particular device 110 receives the request for proximity data from the new device 108, the agent 206a of the device 110 verifies the request by verifying the signed token received with the request (e.g., verifying the user's digital signature). If the request is verified, then the agent 206a obtains and/or generates proximity data based on the proximity of the device 110 to the new device 108.

In response to verifying the request, the agent 206a obtains and/or generates proximity data based on the proximity of the device 110 to the new device 108. For example, to generate proximity data, the agent 206a may measure the strength of a radio signal received from the new device 108.

In embodiments, the agent 206a may then generate a proximity certificate that includes an identifier for the device, proximity data (e.g., measurement and/or measurement type), and a cryptographic signature of the device (e.g., using an encryption key assigned to the device). In embodiments, the certificate may be an X.509 certificate. The agent 206a then transmits the proximity certificate 208 to the new device 108.

As shown, the agent 206b on the new device 108 collects the proximity certificates 208 from the device 110 (and one or more other devices 110) and transmits them to the device management service 104. In some embodiments, the agent 206a verifies each of the certificates based on the respective signatures of each certificate before sending the certificate to the device management service 104. For any certificates that are found to be invalid for any reason, the agent 206b may discard the certificate and/or proximity data. In such embodiments, the proximity verification may be performed at the new device 108 instead of at the device management service 104.

In some embodiments, the agent 206b may obtain the proximity data and/or other data from the verified certificates. The agent 206b may then forward the obtained data to the device management service 104. In some embodiments, the proximity data may be processed by the agent 206b and then transmitted to the device management service 104. For example, the agent 206b may include a model or algorithm that analyzes the proximity data and remove at least a portion of the proximity data received from the one or more other devices to generate filtered proximity data. For example, the model or algorithm may determine that proximity data from one or more of the other devices 110 is invalid or is not needed in order to determine an estimated location of the new device 108 with at least a minimum accuracy or confidence level (e.g., at least 90% accuracy or confidence level).

In some embodiments, the new device itself may determine an estimated location of the new device based at least on the proximity data and determine a contextual identity for the new device based on the estimated location (instead of the device management service 104). The new device may then transmit the contextual identity to the device management service 104, where it is assigned to the new device and stored as described herein.

In embodiments, a hub device on the client network may perform at least some or all of the actions described herein for the device management service 104 to assign a contextual identity to the new device (e.g., using an agent and data installed on the hub device). For example, the hub device may collect the proximity certificates, determine an estimated location of the new device based at least on the proximity data, determine a contextual identity for the new device based on the estimated location, and assign the contextual identity to the new device. In embodiments, the hub device may transmit the contextual identity to the device management service 104, where it is assigned to the new device and stored as described herein.

Figure 3:
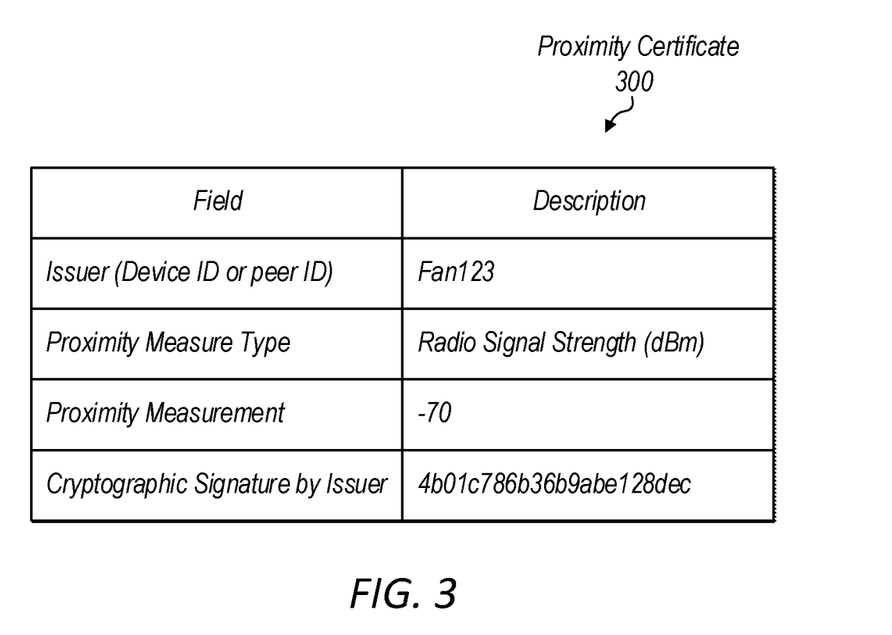
FIG. 3 illustrates an example of a proximity certificate generated by a device of a client network, according to some embodiments.

FIG. 3 illustrates an example of a proximity certificate generated by a device of a client network, according to some embodiments. The proximity certificate may include any number of fields that store values for attributes associated with a device (e.g., one of the devices 110 of FIG. 1 or 2).

As depicted, the proximity certificate 300 specifies "Fan123" as the issuer (or device ID) of the certificate. The value of this field may be unique with respect to other devices of the client and/or client network in order for the device management service or user/administrator to uniquely identify the device with respect to other devices.

The proximity certificate 300 also specifies "Radio Signal Strength (dBm)" as the type of proximity measurement performed by the device (decibel-milliwatts). The proximity certificate 300 specifies "−70" as the value of the proximity measurement performed by the device. Based on these fields, the device management service may determine that the proximity data for the device includes a measurement of −70 dBm for the radio signal strength. As discussed herein, any other suitable type of proximity measurement may be specified by these fields, depending on the configuration of the device (e.g., configuration of the agent, sensors, etc.). In embodiments, the proximity certificate 300 may include any number of the above fields to indicate any combination of proximity measurements, as described herein.

The proximity certificate 300 also specifies a value for the cryptographic signature of the issuer (e.g., the device). In embodiments, this may indicate a digital signature for the certificate that was performed by the device using an encryption key (e.g., according to the X.509 standard). In embodiments, the proximity certificate 300 may include any other number of fields that may be used by the device management service and/or a user/administrator to perform any actions described herein. For example, the proximity certificate 300 may specify values for type of the device, network address or subnet of the device, the contextual identity of the device, the location and/or estimated location of the device, etc. Therefore, in embodiments, a device management service, hub device, or the new device itself may obtain any of the attributes for the devices described herein from the proximity certificate 300 (instead of, for example, client data 118 or registered devices 120).

In embodiments, the proximity certificate and/or proximity data may include any other data/fields that indicate any other attributes of the device providing the certificate/data. For example, the proximity certificate may specify a color of the device, size of the device, type of hardware and/or hardware components used in the device (e.g., processor type/speed or memory size), manufacturer of the device and/or any hardware components of the device, one or more frequencies at which the device can communicate, etc. Thus, a proximity certificate may specify attributes of the device that would otherwise be difficult or not possible for the device management service to obtain.

Figure 4:
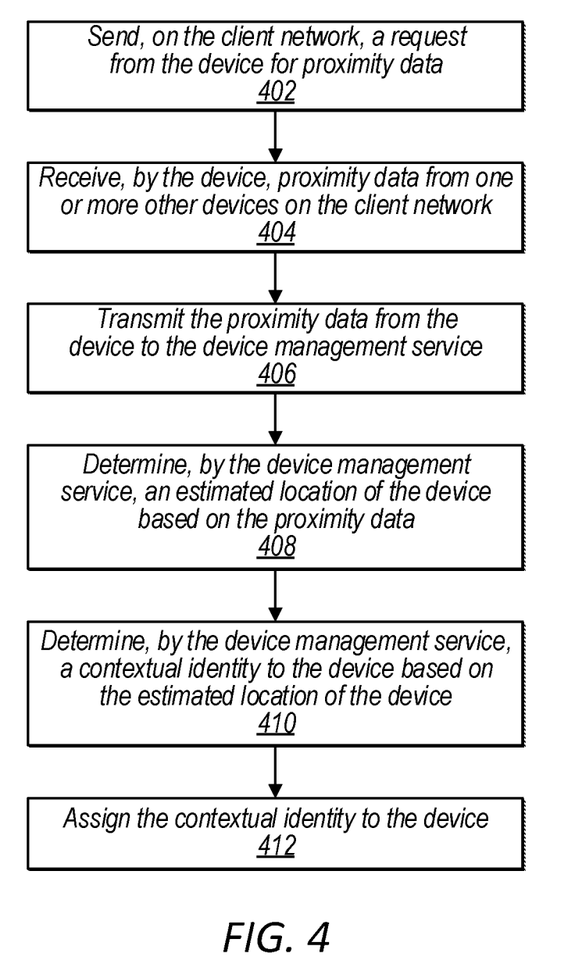
FIG. 4 is a flow diagram that illustrates assigning contextual identity to a new device of a client network based on proximity of other devices, according to some embodiments.

FIG. 4 is a flow diagram that illustrates assigning contextual identity to a new device of a client network based on proximity of other devices, according to some embodiments. At block 402, a newly installed device sends/transmits a request on the client network for proximity data (e.g., broadcasts the request to one or more other devices on the client network). At block 404, the new device receives proximity data from one or more other device on the client network.

At block 406, the device transmits the proximity data to the device management service. At block 408, the device management service determines an estimated location of the new device based on the proximity data. At block 410, the device management service determines a contextual identity of the new device based at least on the estimated location of the new device. At block 412, the device management service assigns the contextual identity to the new device.

In some embodiments, the device management service determines the contextual identity of the new device based at least on a contextual identity that is assigned to one or more of the other devices on the client network. For example, the device management service may determine, based at least on the estimated location of the new device, one or more of the registered devices that are located closest to the new device (comparted to one or more other registered devices) or within a threshold distance of the new device (e.g., based on actual or estimated locations that are already stored by the device management service for the other devices, since the other devices are previously registered devices). The device management service may then determine a particular contextual identity that is assigned to the one or more closest devices or the one or more devices within the threshold distance (e.g., the closest device, the two closest devices, the tree closest devices, etc.). The device management service may then assign the particular contextual identity to the new device.

Figure 5:
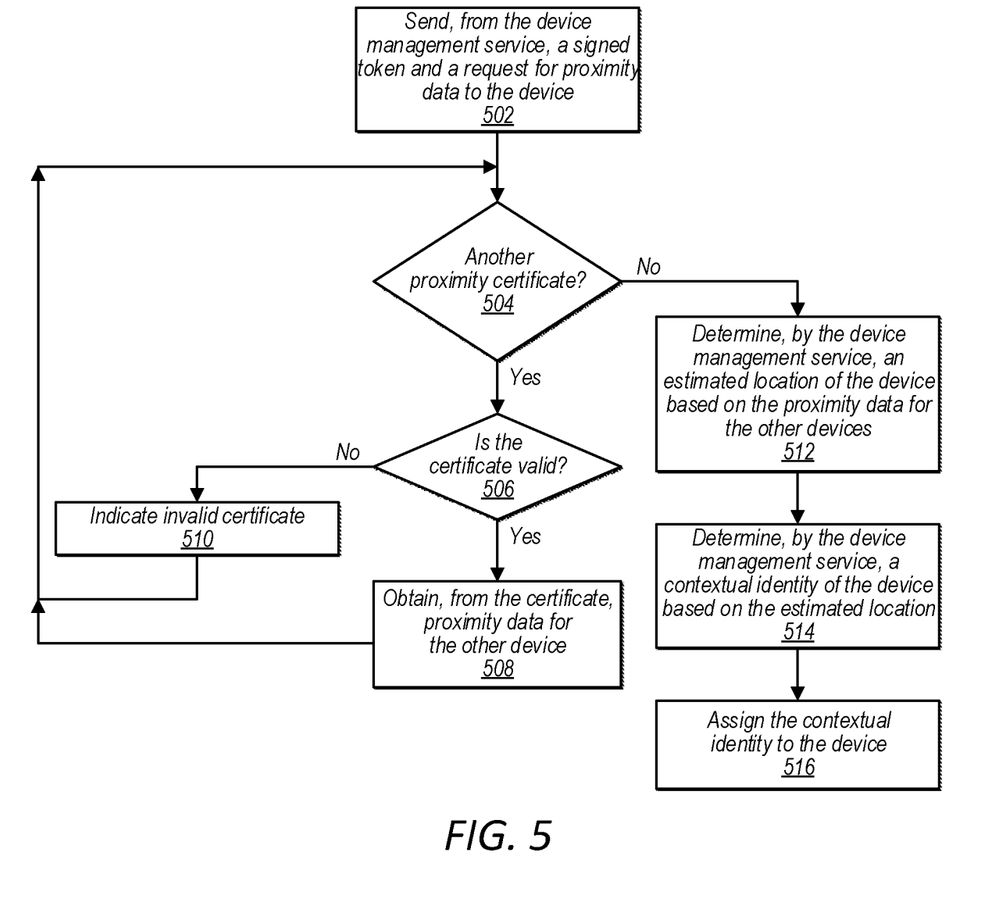
FIG. 5 is a flow diagram that illustrates a device management service that assigns contextual identity to a new device of a client network based on proximity of other devices, according to some embodiments.

FIG. 5 is a flow diagram that illustrates a device management service that assigns contextual identity to a new device of a client network based on proximity of other devices, according to some embodiments. At block 502, the device management service sends a signed token and a request to a newly installed device for proximity data of other devices.

At block 504, the device management service determines whether there is another proximity certificate for another device (e.g., received from the new device). In some embodiments, the other device on the network may transmit the certificate to the device management service instead of the new device itself. In embodiments, if device management service determines that a proximity certificate has not been received for at least a threshold period of time, then the device management service determines that there is not another proximity certificate and proceeds to block 512.

If the device management service determines that there is another proximity certificate, then at block 506, the device management service determines whether the proximity certificate is valid (e.g., based on the cryptographic signature of the certificate). If the proximity certificate is valid, then at block 508, the device management service obtains proximity data for the other device from the certificate and the process returns to block 504. If the proximity certificate is invalid, then at block 510, the device management service indicates that the certificate is invalid (e.g., sends an alert message to a user/administrator at the client network and/or stores the indication at the device management service) and the process returns to block 504.

At block 504, if the device management service determines that there are no more proximity certificates for the new device, then at block 512, the device management service determines an estimated location of the new device based on the proximity data for the other devices. At block 514, the device management service determines a contextual identity for the new device based on the estimated location. At block 516, the device management service assigns the contextual identity to the new device.

Figure 6:
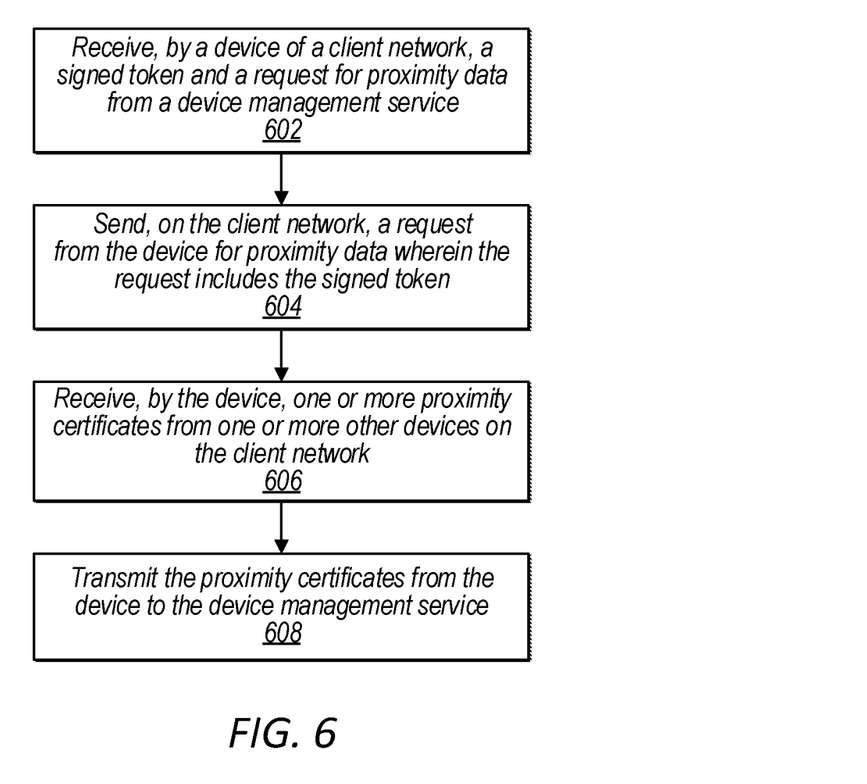
FIG. 6 is a flow diagram that illustrates a new device of a client network that obtains proximity data from other devices, provides the proximity data to a device management service, and receives a contextual identity from the device management service, according to some embodiments.

FIG. 6 is a flow diagram that illustrates a new device of a client network that obtains proximity data from other devices, provides the proximity data to a device management service, and receives a contextual identity from the device management service, according to some embodiments. At block 602, a newly installed device at a client network receives a signed token and a request for proximity data from a device management service. In some embodiments, the request may include the signed token.

At block 604, the new device sends, on the client network, a request for proximity data and the signed token (e.g., broadcasts the request to one or more other devices on the client network). In embodiments, the request may include the signed token. At block 606, the new device receives one or more proximity certificates from each of one or more other devices on the client network (e.g., device that are registered with the device management service). In embodiments, since the other devices are already registered, the device management service already has the estimated locations of each one and has already assigned a contextual identity to each one. In embodiments, any number or type of devices may send a proximity certificate to the new device. For example, the new device may be a light bulb that receives a proximity certificate from each of three other lightbulbs, another proximity certificate from a fan, another proximity certificate a thermostat, and another proximity certificate from a smoke detector.

At block 608, the new device transmits the proximity certificates to the device management service. In embodiments, the proximity certificates (e.g., proximity data) are configured to be used, by the remote provider network, to determine an estimated location of the device and to determine/assign a contextual identity for the device that is associated with the estimated location (e.g., based on a mapping, etc. as described herein).

Figure 7:
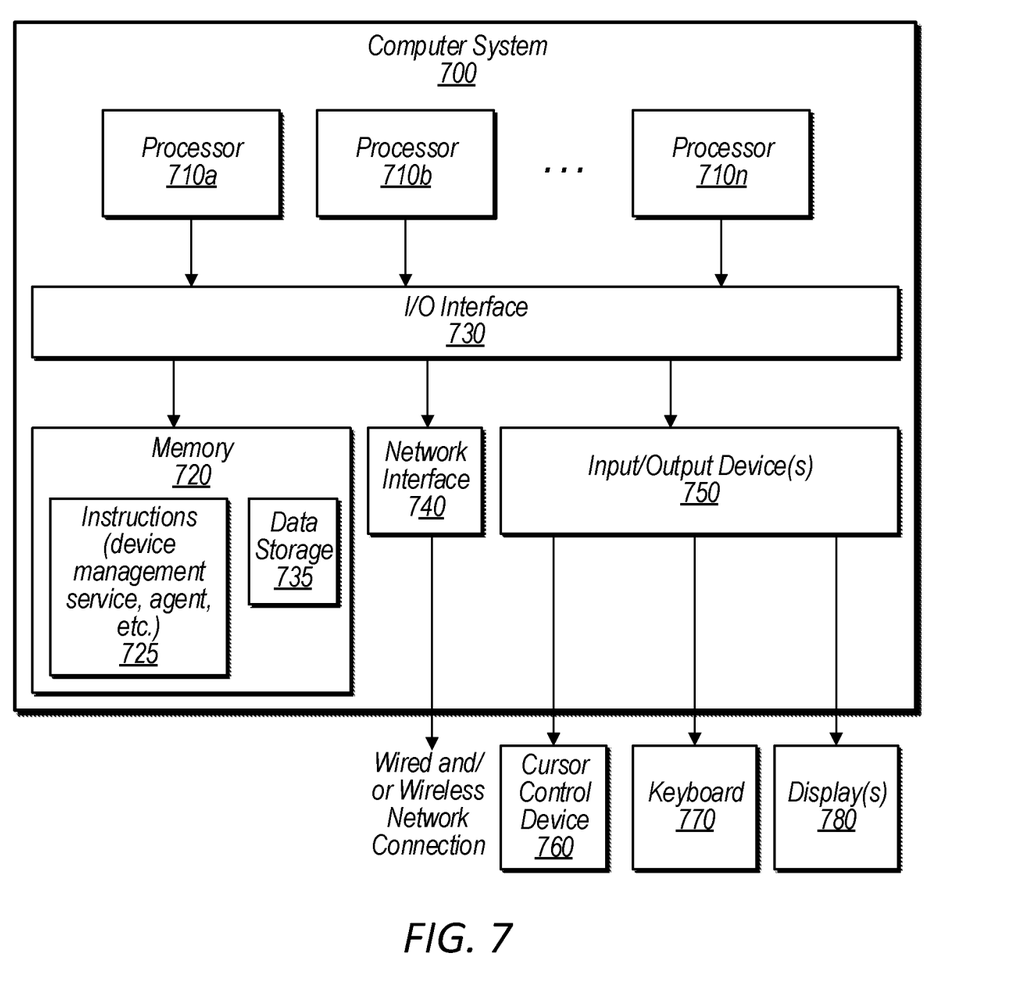
FIG. 7 is a block diagram illustrating an example computer system that implements some or all of the techniques described herein, according to some embodiments.

Any of various computer systems may be configured to implement processes associated with the provider network, device management service, client network, new device, other devices, or any other component of the above figures. For example, FIG. 7 is a block diagram illustrating an example computer system that implements some or all of the techniques described herein, according to some embodiments. In various embodiments, the provider network, device management service, client network, new device, other devices, or any other component of any of FIGS. 1-6 may each include one or more computer systems 700 such as that illustrated in FIG. 7. In embodiments, the provider network, device management service, client network, new device, other devices, or any other component may include one or more components of the computer system 700 that function in a same or similar way as described for the computer system 700.

In the illustrated embodiment, computer system 700 includes one or more processors 710 coupled to a system memory 720 via an input/output (I/O) interface 730. Computer system 700 further includes a network interface 740 coupled to I/O interface 730. In some embodiments, computer system 700 may be illustrative of servers implementing enterprise logic or downloadable application, while in other embodiments servers may include more, fewer, or different elements than computer system 700.

In various embodiments, computer system 700 may be a uniprocessor system including one processor 710, or a multiprocessor system including several processors 710 (e.g., two, four, eight, or another suitable number). Processors 710 may be any suitable processors capable of executing instructions. For example, in various embodiments, processors 710 may be embedded processors implementing any of a variety of instruction set architectures (ISAs), such as the x106, PowerPC, SPARC, or MIPS ISAs, or any other suitable ISA. In multiprocessor systems, each of processors 710 may commonly, but not necessarily, implement the same ISA.

System memory 720 may be configured to store instructions and data accessible by processor 710. In various embodiments, system memory 720 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for the provider network (e.g., the device management service) or client network (e.g., agents on the new device or other devices) are shown stored within system memory 720 as program instructions 725. In some embodiments, system memory 720 may include data 735 which may be configured as described herein.

In one embodiment, I/O interface 730 may be configured to coordinate I/O traffic between processor 710, system memory 720 and any peripheral devices in the system, including through network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments, some or all of the functionality of I/O interface 730, such as an interface to system memory 720, may be incorporated directly into processor 710.

Network interface 740 may be configured to allow data to be exchanged between computer system 700 and other computer systems 700 or devices attached to a network, such as the local network discussed above, a wide-area network, or a local network within the provider network, for example. In particular, network interface 740 may be configured to allow communication between computer system 700 and/or various I/O devices 750. I/O devices 750 may include scanning devices, display devices, input devices and/or other communication devices, as described herein. Network interface 740 may commonly support one or more wireless networking protocols (e.g., Wi-Fi/IEEE 802.11, or another wireless networking standard). However, in various embodiments, network interface 740 may support communication via any suitable wired or wireless general data networks, such as other types of Ethernet networks, for example. Additionally, network interface 740 may support communication via telecommunications/telephony networks such as analog voice networks or digital fiber communications networks, via storage area networks such as Fibre Channel SANs, or via any other suitable type of network and/or protocol.

In some embodiments, system memory 720 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 700 via I/O interface 730. A computer-readable storage medium may also include any volatile or non-volatile media such as RAM (e.g. SDRAM, DDR SDRAM, RDRAM, SRAM, etc.), ROM, etc., that may be included in some embodiments of computer system 700 as system memory 720 or another type of memory. Further, a computer-accessible medium may include transmission media or signals such as electrical, electromagnetic, or digital signals, conveyed via a communication medium such as a network and/or a wireless link, such as may be implemented via network interface 740.

In some embodiments, I/O devices 750 may be relatively simple or "thin" client devices. For example, I/O devices 750 may be configured as dumb terminals with display, data entry and communications capabilities, but otherwise little computational functionality. However, in some embodiments, I/O devices 750 may be computer systems configured similarly to computer system 700, including one or more processors 710 and various other devices (though in some embodiments, a computer system 700 implementing an I/O device 750 may have somewhat different devices, or different classes of devices).

In various embodiments, I/O devices 750 (e.g., scanners or display devices and other communication devices) may include, but are not limited to, one or more of: handheld devices, devices worn by or attached to a person, and devices integrated into or mounted on any mobile or fixed equipment, according to various embodiments. I/O devices 750 may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 700. In general, an I/O device 750 (e.g., cursor control device 760, keyboard 770, or display(s) 780 may be any device that can communicate with elements of computing system 700.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the provider network, device management service, client network, new device, other devices, or any other component and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:
    one or more processors; and
    one or more memories, wherein the one or more memories have stored thereon instructions, which when executed by the one or more processors, cause the one or more processors to implement a device management service of a provider network for one or more clients, wherein the device management service is configured to, for an individual device of a given client that is to be registered with the device management service:
        receive, from a remote network of the client, proximity data for one or more other devices of the remote network that are registered with the device management service, wherein the proximity data is based at least on proximity of the one or more other devices to the individual device;
        determine, based at least on the proximity data for the one or more other devices, an estimated location of the individual device;
        determine a contextual identity for the individual device based at least on the estimated location; and
        assign the contextual identity to the individual device.

2. The system as recited in claim 1, wherein the device management service is configured to send, to the individual device, a signed token, wherein the signed token is configured to be used by the one or more other devices of the remote network to verify one or more requests received from the individual device for the proximity data.

3. The system as recited in claim 1, wherein to receive, from the remote network, proximity data for one or more other devices of the remote network, the device management service is configured to receive, from the individual device, the proximity data for the one or more other devices of the remote network.

4. The system as recited in claim 3, wherein to receive, from a remote network of the client, proximity data for one or more other devices of the remote network, the device management service is configured to:
    receive one or more proximity certificates respectively generated by the one or more other devices, and
    wherein the device management service is further configured to:
        verify the one or more proximity certificates based on respective signatures of the one or more proximity certificates.

5. The system as recited in claim 3, wherein the proximity data comprises one or more measurements of strength of an electromagnetic signal received by the one or more other devices from the individual device.

6. A method, comprising:
    performing, by one or more computing devices of a provider network that implement a device management service:
        receiving, from a remote network, proximity data for a registered device of the remote network, wherein the proximity data indicates a proximity of the registered device to a particular device on the remote network;
        determining, based at least on the proximity data, an estimated location of the particular device;
        determining a contextual identity for the particular device based at least on the estimated location; and
        assigning the contextual identity to the particular device.

7. The method as recited in claim 6, further comprising:
    sending, to the particular device, a signed token, wherein the signed token is configured to be used by the registered device to verify one or more requests received from the particular device for the proximity data.

8. The method as recited in claim 6, wherein receiving, from a remote network, proximity data for the registered device of the remote network comprises:
receiving the proximity data from the registered device of the remote network, or
receiving the proximity data from a hub device of the remote network that is communicatively coupled with the registered device.

9. The method as recited in claim 6, wherein the proximity data is included within a proximity certificate generated by the registered device, and wherein the method further comprises:
verifying the proximity certificate based on a signature of the proximity certificate.

10. The method as recited in claim 6, wherein the proximity data comprises one or more measurements of strength of an electromagnetic signal or sound received by the registered device from the particular device.

11. The method as recited in claim 6, wherein the proximity data comprises one or more measurements of a direction vector of the electromagnetic signal or sound received by the registered device from the particular device.

12. The method as recited in claim 6, wherein determining, based at least on the proximity data for the registered device, an estimated location of the particular device further comprises:
determining the estimated location of the particular device based on one or more of:
a type of the registered device,
a floor plan associated with the remote network, or
global positioning system (GPS) data provided by the registered device.

13. The method as recited in claim 6, wherein determining a contextual identity for the particular device comprises:
determining, based at least on the estimated location of the particular device, that the registered device is located closest to the particular device relative to other registered devices on the remote network; and
determining another contextual identity that is assigned to the registered device; and
assigning the other contextual identity to the particular device.

14. The method as recited in claim 6, wherein determining a contextual identity for the particular device comprises:
determining one or more potential contextual identities for the particular device based at least on the estimated location; and
receiving, from a user, a selection of the contextual identity from among the one or more potential contextual identities.

15. A device connected to a client network, the device comprising:
one or more processors; and
one or more memories, wherein the one or more memories have stored thereon instructions, which when executed by the one or more processors, cause the one or more processors to:
receive proximity data from a registered device of the client network that is registered with a device management service of a remote provider network, wherein the proximity data for the registered device is based at least on proximity of the registered device to the device; and
transmit the proximity data for the registered device to the device management service, wherein the proximity data is configured to be used, by the device management service, for determination of a contextual identity for the device based at least on the proximity data.

16. The device of claim 15, further comprising instructions that, when executed by the one or more processors, cause the one or more processors to:
receive, from the device management service, a signed token; and
send, on the client network, a request for the proximity data, wherein the request includes the signed token, and wherein the signed token is configured to be used by the registered device to verify the request for the proximity data.

17. The device of claim 15, wherein to receive the proximity data from the registered device connected to the client network, the instructions, when executed by the one or more processors, cause the one or more processors to:
receive, from the registered device, a proximity certificate that comprises the proximity data, wherein the proximity certificate comprises a cryptographic signature associated with the registered device.

18. The device of claim 15, wherein the proximity data comprises one or measurements of strength of an electromagnetic signal received by the registered device from the device.

19. The device of claim 18, wherein the proximity data comprises one or more measurements of a direction vector of the electromagnetic signal received by the registered device from the device.

20. The device of claim 15, further comprising instructions that, when executed by the one or more processors, cause the one or more processors to:
remove at least a portion of the proximity data received from the registered device to generate filtered proximity data; and
wherein to transmit the proximity data for the registered device to a device management service, the instructions, when executed by the one or more processors, cause the one or more processors to:
transmit the filtered proximity data to the device management service.

* * * * *